United States Patent [19]

Recalde

[11] Patent Number: 4,721,410

[45] Date of Patent: Jan. 26, 1988

[54] REEL PIPE COATING AND LAYING VESSEL AND PROCESS

[75] Inventor: Carlos E. Recalde, Irvine, Calif.

[73] Assignee: Santa Fe International Corporation, Alhambra, Calif.

[21] Appl. No.: 696,188

[22] Filed: Jan. 29, 1985

[51] Int. Cl.$^4$ ............................................. F16L 1/04
[52] U.S. Cl. ..................................... 405/166; 405/155; 405/168
[58] Field of Search ............... 405/155, 156, 157, 158, 405/166, 168; 264/34, 35

[56] References Cited

U.S. PATENT DOCUMENTS

| | | | |
|---|---|---|---|
| 2,605,202 | 7/1952 | Reynolds | 405/156 X |
| 2,910,835 | 11/1959 | Timothy | 405/166 |
| 3,599,435 | 8/1971 | Kolb | 405/166 X |
| 3,715,890 | 2/1973 | Langner | 405/166 |
| 3,855,835 | 12/1974 | Tisdale et al. | 405/166 X |
| 4,075,300 | 2/1978 | Keller | 405/155 X |
| 4,110,991 | 9/1978 | Torkuhl | 405/155 X |

FOREIGN PATENT DOCUMENTS 2503618   7/1975   Fed. Rep. of Germany ...... 405/155

Primary Examiner—David H. Corbin
Attorney, Agent, or Firm—Harris, Kern, Wallen & Tinsley

[57] ABSTRACT

A pipeline vessel for laying out and coating a pipeline from a storage reel onto the bottom of a body of water. The vessel equipment provides for both straightening and tensioning of the pipeline as well as coating with a wide range of concrete and/or polymer coats. Both extrusion type thermoplastic coatings and reacted in situ thermoset resins are employed. The process of laying a relatively inflexible pipeline from such a reel pipelaying vessel and coating the pipe as it is laid out is also provided.

37 Claims, 8 Drawing Figures

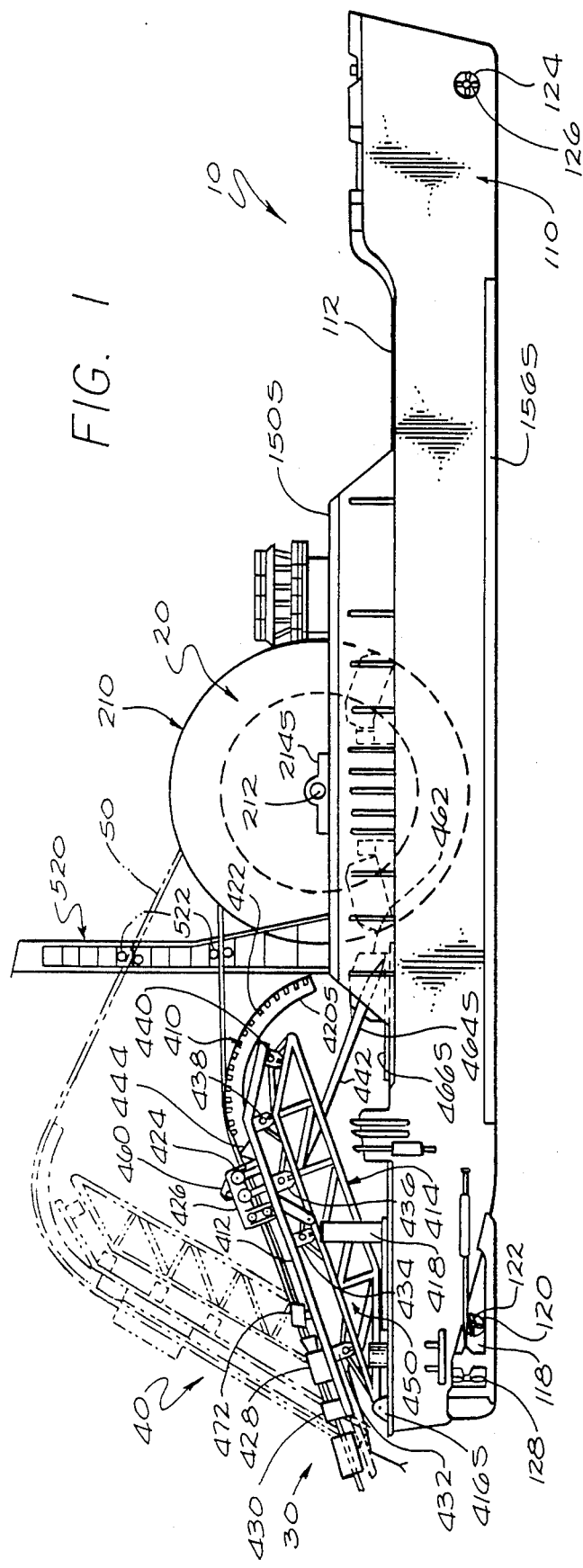
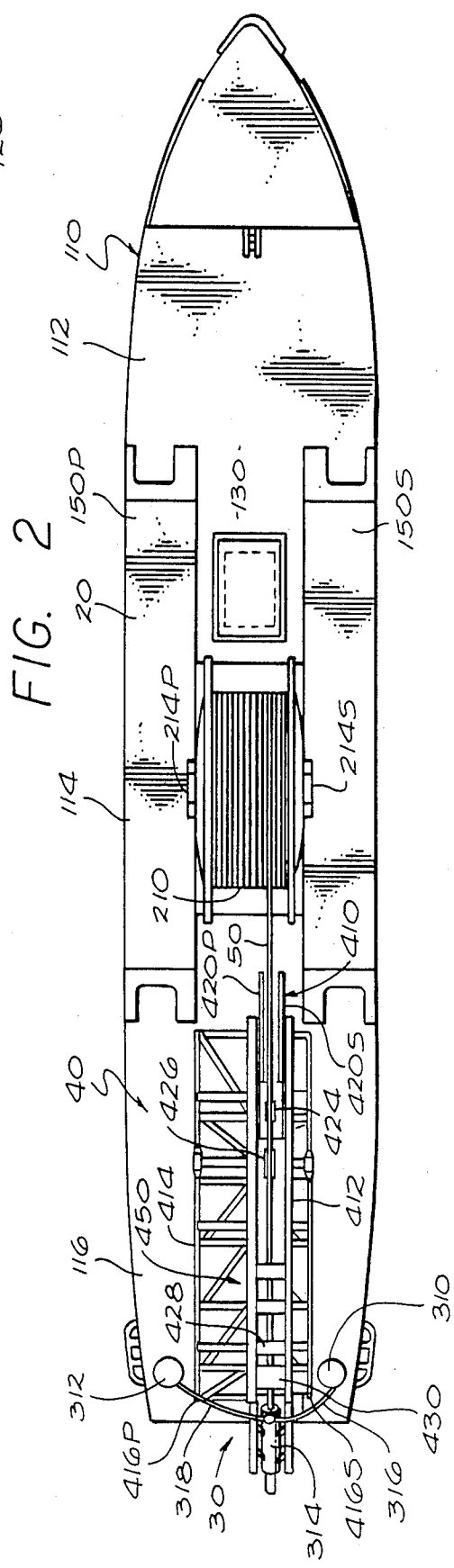

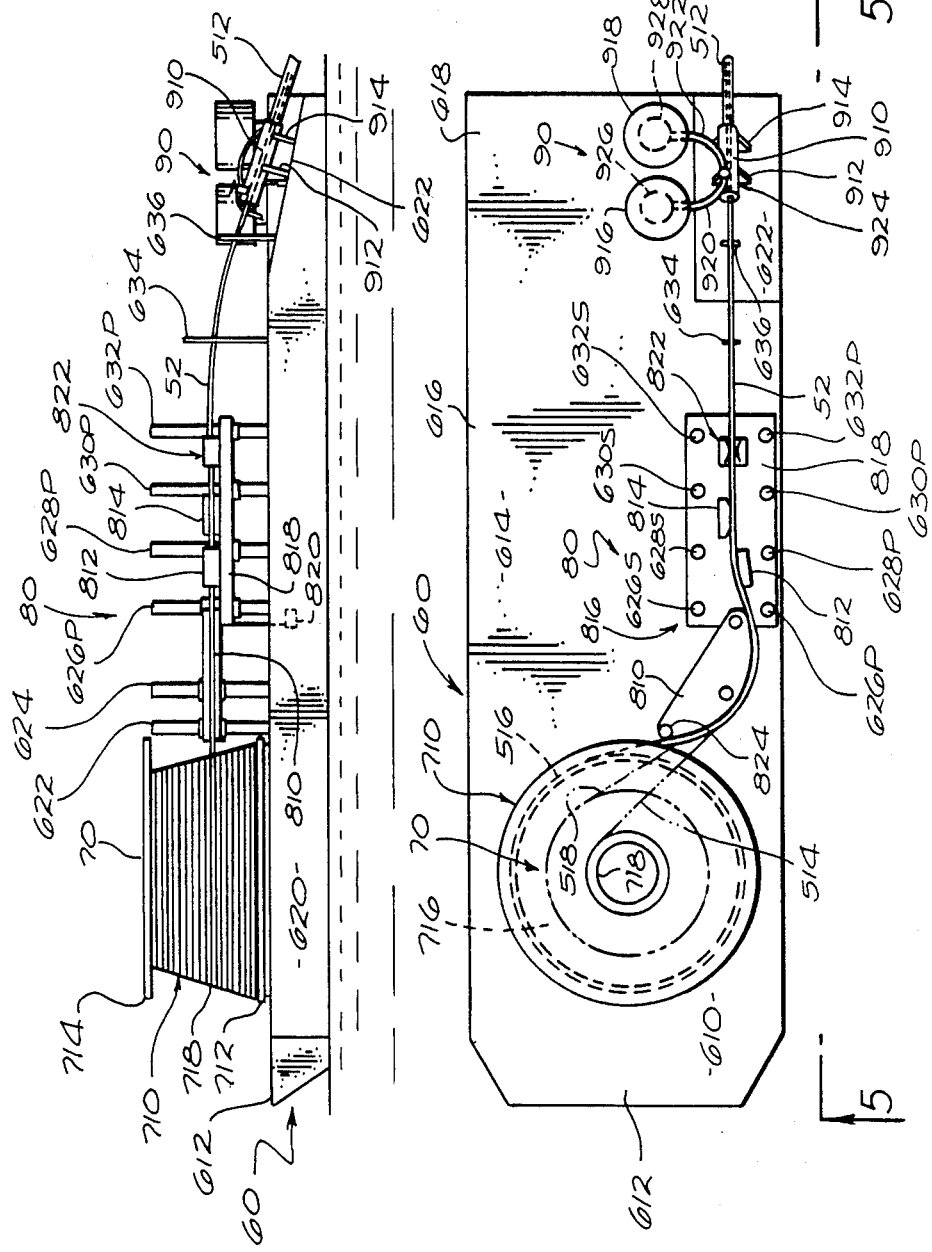

REEL PIPE COATING AND LAYING VESSEL AND PROCESS

TECHNICAL FIELD

This invention relates to a reel pipelaying vessel which is provided with means to lay out a pipeline on the bottom of a body of water. More particularly, the invention pertains to a new type of pipelaying vessel, which provides for both coating a pipeline and unreeling the same for subsea disposition.

BACKGROUND OF THE INVENTION

Reel pipelaying vessels in the prior art have been generally of two types. The first of those utilizing a large horizontally disposed reel which is permanently mounted to a barge. A well-known pipelaying vessel of this type is known in the offshore industry as the "Chickasaw" which is described in the following patents, all of which are assigned to the assignee of the invention hereof:
Sugasti et al—U.S. Pat. No. 3,630,461
Gibson—U.S. Pat. No. 3,641,778
Mott et al—U.S. Pat. No. 3,680,432
Key et al—U.S. Pat. No. 3,712,100

A second type of pipelaying vessel is a reel ship which has a particular hull construction to accomodate the support and operation of a vertically disposed reel. Such a reel ship has an advantage in being able to discharge pipe in deep waters where it is extremely difficult or impossible for horizontal reel barges to operate. This deep water laying capability is provided by an adjustable ramp assembly which mounts the pipe conditioning apparatus required for straightening and tensioning near the stern of the ship. Such ramp assemblies are adjustable to allow pipe to enter the water at very steep angles up to about 60° while the horizontal reel barges are limited to about a 15° entry angle.

A vertical reel dynamically positioned ship known as the "Apache" is well-known in the trade and is described in the following U.S. patents, all assigned to the assignee of the invention hereof:
Springett et al—U.S. Pat. No. 4,230,421
Uyeda—U.S. Pat. No. 4,269,540
Yenzer et al—U.S. Pat. No. 4,297,054
Springett et al—U.S. Pat. No. 4,340,322
Uyeda et al—U.S. Pat. No. 4,345,855

The pipelaying vessels utilized in the offshore industry are capable of laying out pipelines with only prefabricated coatings thereon. Such coatings must be elastic and highly flexible since the pipeline is reeled onto the storage reels prior to layout. Such vessels have not been able to layout pipelines with relatively thick or inelastic coatings which can provide improved corrosion resistance, thermal insulation, dimensional integrity, and increased weight/unit length for the pipelines.

U.S. Pat. No. 3,599,435 describes but does not show a method for laying coated pipelines underwater involving a "stovepipe" layout. The coating of pipeline sections prior to the tensioning means only incurs the problem of fracturing the coating. This problem is somewhat alleviated by the solution set forth, but is not solved thereby. In this method there is no conditioning of the pipeline since there is no reel used. Coating prior to straightening would produce fractures in any coating layers deposited.

There are increasingly frequent requests in the offshore construction industry for the layout of pipelines having relatively thick walled coatings hereon.

SUMMARY OF THE INVENTION

A pipeline vessel is provided in which a horizontally or vertically mounted storage reel unspools pipeline into a conditioning apparatus which provides for both straightening and tensioning of the pipeline. A coating apparatus is then provided for coating the pipeline as it is laid from the vessel into a body of water. The coating apparatus can be employed to either coat segments of the pipeline which are maintained relatively stationary with respect to the vessel during the coating process or to coat the pipeline simultaneously with layout.

Both polymeric coatings and concrete or other types of reaction setting coatings can be utilized to provide for pipeline coatings of a wide range of thickness. The invention is not limited to any given thickness range, but a usable range is about $\frac{1}{8}$ inch to about 8 inches.

The coating apparatus includes storage tanks and hoppers for the material utilized to produce the pipe coating. Coating mixing and application devices are also provided as are special curing devices, when required.

The polymeric coatings can be materials such as polypropylene or polyurethanes together with various mineral aggregates. Concrete can be employed and it is preferable to utilize a fast setting concrete for this purpose.

Another important feature of the present invention is to deposit multiple coating layers on the pipeline as it is unreeled and laid out. A plurality of application devices are arranged about the pipeline for this purpose. Such devices can be arranged concentrically or axially with respect to the pipeline and can be contained within a single coating device jacket. A preferred use of this feature is to provide for a first layer of fast curing concrete and to then immediately coat the concrete with one or more water impervious polymeric coating layers to protect the underlying concrete from sea water during the time period over which the curing process is completed. Since this overcoating protection function is temporary a lower cost coating material such as polyethylene or other polyalkylene material can be employed.

The use of multiple coating layers permits various coated pipeline properties such as a thermal insulation by use of a pore-formed layer and then the use of one or more overcoating protective layers. In seas characterized by bottom rock formations an outer coating with high abrasion resistance can be used. An example is a polyurethane coating filled with steel or lead pellets in which the continuous polymer phase has a density in the upper part of a density range of 80 to 250 pounds per cubic foot. The thickness of such a protective coating can vary from about one-eighth ($\frac{1}{8}$) to eight (8) inches.

The pipelaying vessels upon which the coating apparatus of the present invention can usefully be placed are either barges or reel ships. For both types of vessels the pipeline can be stored on a portable reel which can be adapted for loading onto and off of the vessel deck as required. The portable reels can also be adapted for spooling on of pipeline prior to loading or after installation on the vessel deck.

It is therefore, an object of the present invention to provide a pipelaying vessel which has a pipeline coating apparatus provided for use thereon.

Another object of the present invention is to provide removable coatings means which can be easily installed for use on existing reel pipelaying vessels when needed and can be removed for pipeline jobs where coating is not required.

Yet another object of the present invention is to provide a method of pipelaying which includes the step of adding a coating to the pipeline as it is laid out.

These and other objects of the present invention will be apparent from the following description and drawings. The disclosure herein is related to the pipelaying vessels described in U.S. Pat. Nos. 3,712,100 to Key et al and 4,345,855 to Uyeda et al, the disclosures of which are expressly incorporated by reference as though fully set forth herein. The other patents set forth in the above background, except for U.S. Pat. No. 3,599,435, also relate to this application and the disclosures of those patents are also expressly incorporated by reference as though fully set forth herein.

BRIEF DESCRIPTION OF THE DRAWINGS

FIG. 1 starboard side elevation general layout view of a preferred embodiment of the reel pipelaying vessel of the present invention;

FIG. 2 is a top plan view of the reel vessel of FIG. 1;

FIG. 5 is a side elevation view of a second embodiment of the vessel of the present invention;

FIG. 6 is a top plan view of the vessel of FIG. 5; and

DETAILED DESCRIPTION OF THE PREFERRED EMBODIMENTS

Figure 3:
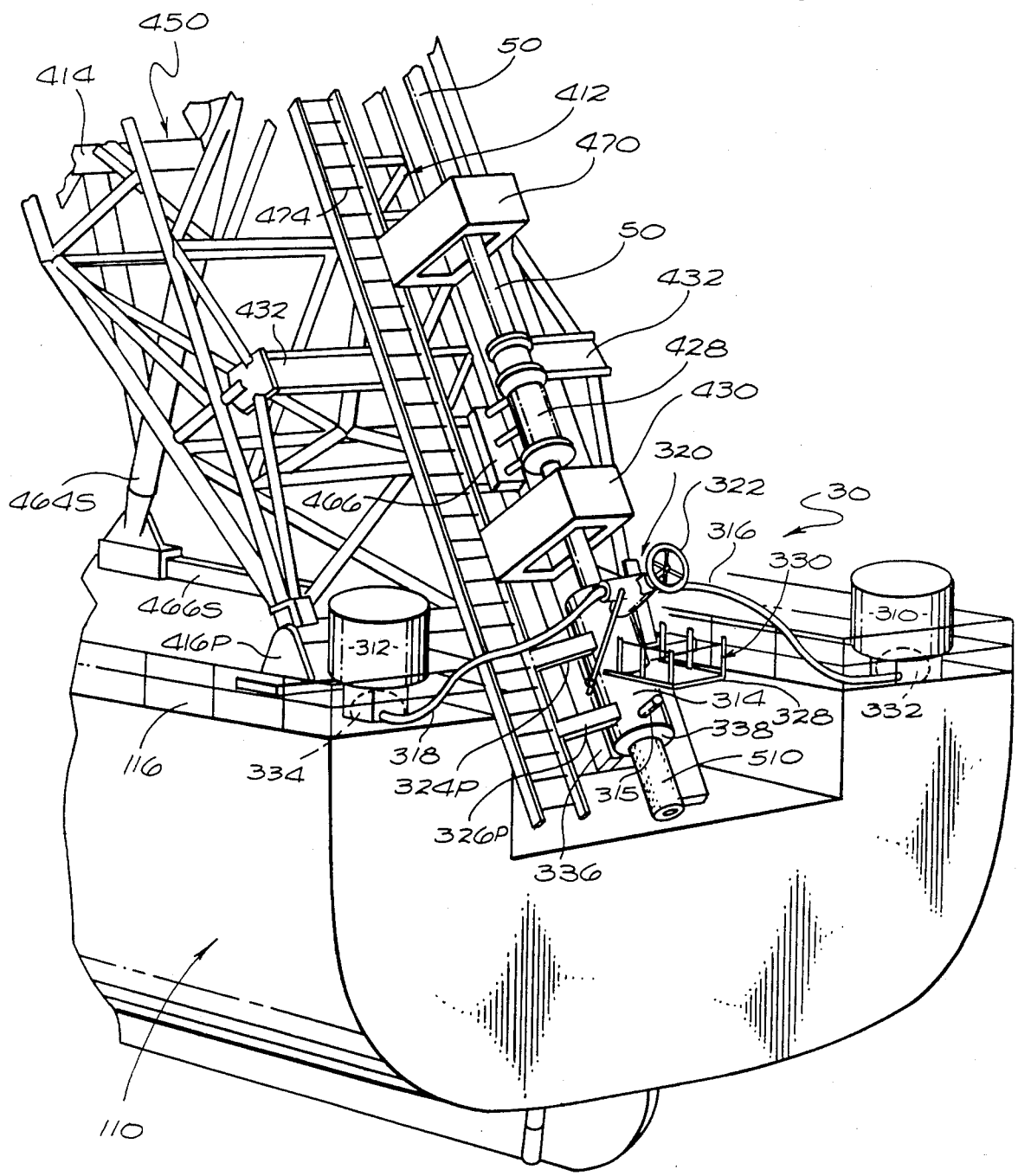
FIG. 3 is an enlarged perspective view of the stern portion of the vessel of FIG. 1 showing the pipeline coating apparatus.

The reel vessel or ship, generally designated 10, is designed to carry a main pipe-spooling reel system and its associated support and drive assemblies, generally designated 20, and the pipe coating apparatus, generally designated 30, is located adjacent the stern of the vessel. Pipe conditioning equipment, generally designated 40, is located aft of the reel system assemblies 20. For each generally designated system or means the individual elements have been enumerated below with three digit set numbers. Similar numerical designations appear in U.S. Pat. No. 4,345,855 to Uyeda et al.

The ship's hull, generally designated 110, comprises a forward section 112, a midship section 114, and a stern section 116.

The stern section 116 preferably includes, on its underside a skeg 118 which serves to increase stern buoyancy, to protect the main propellers 128, from floating or submerged objects or from grounding in shallow water, and to provide a housing for the stern thruster or thrusters 122; and to improve directional stability of the vessel. The skeg 118, which consists of substantially wedged shaped structure after part of the ships keel, is an advantageous but not essential feature of the reel ship. It is particularly useful to increase stern buoyancy at relatively shallow draft, on the order of about 13 ft. to 15 ft., and where the size of the ship may be limited by economic and/or practical considerations, such as the need to be able to negotiate channels or ship channels of relatively limited size.

The skeg also advantageously houses one or more thruster tunnels 120 for stern thrusters 122. The bow section 112 houses one or more thruster tunnels 124 for both thrusters 126. The bow and stern thrusters, which are reversible, assist in course and station keeping by giving the reel ship lateral or transverse positioning capability, while main props 128 provide fore and aft drive end, in conjunction with the ships rudders positioning capability.

Storage reel 210 is supported by a central axle shaft 212 and reel bearings 214s and 214p. The designation "s" stands for starboard and the designation "p" stands for port.

The reel bearings 214s and 214p are mounted on box-beam structures 150s and 150p which are elevated from the main deck 130.

Pipeline 50 is spooled on to reel 210 through tower 520 (shown in FIG. 1) which is fitted with rollers 522 to force each wrap of pipe to be placed in the correct spooled position with respect to the adjacent wraps for loading of the pipeline. Pipe bending radius controller 410 is mounted on the bow end of the level wind assembly 412 which is in turn mounted to the pivotal support ramp assembly 414. Tower 520 has been omitted from FIG. 2 for clarity.

The ramp assembly 414 is pivotal about pivot brackets 416s and 416p which are fixed to the stern section 116 of main deck 130. A hydraulically operated lifting mechanism 418 is provided for changing the pivotal position of the support ramp assembly 412. The radius controller 410 has arcuately shaped frame supports 420s and 420p which contain a plurality of rollers 422. The purpose of the radius controller is to bend the pipeline 50 to a minimum radius during spooling and unspooling to permit the use of a single straighter setting for the particular pipeline being laid out.

After pipeline 50 passes over the radius controller rollers 422, it enters the straightening apparatus 424, and then a tensioning assembly 426, both of which are mounted on the level wind assembly 412. Further along the level wind assembly 412 toward the stern, a pipe tie-in clamping assembly 428 and then a stern pipe guide assembly 430 are positioned to receive the pipeline 50. Various fixed and/or movable work platforms can also be provided for along the level wind assembly 412 which is fitted for lateral movement on a series of roller carriages 432, 434, 436, 438 and 440 with respect to the upper surface of the support ramp assembly 414. A jacking mechanism 442 is also provided in order to move the radius controller 410 about a pivot mounting 444 which is fixed to the upper surface of the level wind assembly 412.

The support ramp assembly 414 is constructed from an open truss framework generally designated as 450 which provides for structural stability for the pipe conditioning equipment 460 which consists primarily of the pipe straightening equipment 424 and the tensioning assembly 426. Other pipe conditioning equipment includes the pipe tie-in clamping assembly 428 and the stern pipe guide assembly 430.

The operation of the hydraulic lifting mechanism 418 is supplemented by a jacking mechanism 462 which operates a pair of jacking trusses 464s and 464p along tracks 466s and 466p. Details of the pipe conditioning equipment 460, the radius controller 410, level wind assembly 412 and support assembly 414 are contained in the above referred to U.S. Pat. No. 4,345,855 to Uyeda et al.

Coating Apparatus

Coating apparatus 30 is shown at the stern end 116 and consists of a starboard side tank or hopper 310 and a port side tank or hopper 312. A coating station 314 is provided for the pipeline 50 to pass through as after it exits from the stern pipe guide assembly 430. The coating material from the tanks or hoppers 310 and 312 are pumped through lines 316 and 318 into a mixing valve 320 which can be fitted with a valve operator 322 as shown in FIG. 3. The coating jacket 314 is affixed to the level wind assembly 412 via supports 324s and 324p and 326s and 326p (for which the port side supports are shown in FIG. 3). An adjustably leveled work platform 328 with safety fencing 330 can also be mounted on the coating station or jacket 314 or on the supports 324 and 326. This platform 328 provides access to valve operator 322.

The coating materials contained in the tanks or hoppers 310 and 312 are provided with pumping apparatus 332 and 334, respectively, which are mounted in the bases of the hoppers or tanks as shown in FIG. 3.

In the case of utilizing concrete as a coating material a water slurry of cement can be pumped from tank 310 into mixer device valve 320 and such slurry can be made up by providing suitable mixing devices for use in preparing and supplying the slurry to the tank. The mixing devices can also be part of the pumping mechanism 332. Hopper 312 can then be utilized for the addition of rock aggregate or other additives to form the desired coating. Water or other fluid transport diluent can be utilized in line 318 for this purpose. If desired, an access water exit port 336 can be utilized for dumping excess diluent water from the mixing valve 320.

When coating 510 is to be fabricated by concrete it is preferred to utilize a two or three minute set up or hardening time. Such fast setting concrete is available commercially. A specific concrete coating apparatus which can be employed is disclosed in U.S. Pat. No. 2,053,307 to Wilson. The apparatus shown can be placed within coating station 314 with the operating controls exposed on the top side for adjustment from platform 328. The hopper 107 is joined to mixing valve 320 and pipeline 50 then becomes the pipe 23 as shown. The quick set up time then assures adequate stability prior to entry into the water. As described below an additional protective coating can be placed over the concrete to permit a period of post layout submerged curing.

When a single polymeric coating 510 is to be applied to pipeline 50, coating station 314 is utilized to house a concentric extruder or a battery of spray nozzles which permit the polymeric composition or reactants therefor to be continuously supplied to the moving pipeline 50. The extruded type of polymeric coatings which are thermoplastic resins such as vinyl chloride-acetate copolymers; plasticized vinyl chloride; copolymers of vinyl chloride and vinylidene chloride; polyisobutylene; polyvinyl acetate and isobutylene-isoprene also known as butyl rubber, can be applied with heating for achieving appropriate extrusion properties and/or vulcanization as in the latter type of coating. Where a prepared thermoplastic coating is to be placed onto the surface within coating jacket 314 the coating material can be stored in both tanks 310 and 312 simultaneously. The thermoset coatings are those formed by the reaction between two or more reactants. For such coatings the separate reactants are stored in separate supply tanks such as 310 and 312. For example, the preferred polyurethane coating can placed onto the pipeline 50 by utilizing a series of concentrically arranged spray nozzles within the coating jacket 314. Polyurethanes are, in general, formed by the reaction of a polyfunctional isocyanate compound or polymer with one or more polyfunctional amine, carboxyl or hydroxyl reactants. The latter hydroxyl reactants are usually polyester or polyether polyols. In these reactions the extremely reactive isocyanate group —N=C=O reacts with the functional groups of the latter reactant. Epoxy resin chains contain hydroxyl groups and are thus often crosslinked with polyfunctional isocyanates.

For the epoxy resins based polyurethanes supply tank 310 is utilized for the epoxy resin and tank 312 is utilized for storage of the polyfunctional isocyanate reactant. This same bifurcation of the reactants is employed when a polyester polyol reactant is used for forming the polyurethane. Suitable polyols are set forth in U.S. Pat. Nos. 3,443,984 to Stewart and 4,375,498 to Le Minez.

Figure 8:
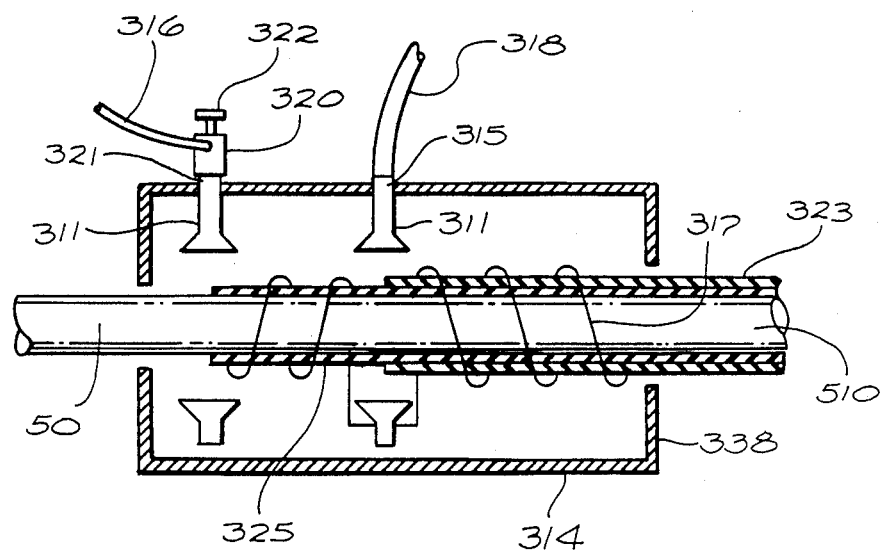

A preferred polyurethane coating is manufactured under the brand name COUMITE by Joint Systems Corporation, Houston, Tex. and can be sprayed onto the outer surfaces of pipeline 50. Various inert mineral fillers such as barites and ferrites are also mixed into the coating along with the polyfunctional isocyanate and polyol reactants. The resulting polyurethane can have an inplace density in the range of about 9 to 240 pounds per cubic foot, and the compressive strength range is 400 to 6,500 pounds per square inch. The two primary reactants are stored separately in tanks 310 and 312 and are pumped through the series of mixing type atomization spray nozzles 311 (FIG. 8) mounted inside coating jacket 314. These nozzles each have spray delivery capacities of about 40 pounds per minute. The coating thickness range can vary from about ⅛ to 8 inches with this apparatus and coating material. For a coating between ½ inch to 1 inch in thickness the set time is about 20–45 seconds and the polyurethane fully cures within a few minutes.

When desired, a first concrete coating can be placed about pipeline 50 as above disclosed and then the series of spray nozzles for laying down a relatively thin protective layer of polyurethane can be arranged within the lower portion of coating jacket 314. An entry port 315 can be installed for the reactants lines. Suitable reactants storage tanks are then installed within hull 110. The polyurethane can thus be sprayed onto the fast setting concrete layer to provide a protective outer coating. The concrete coated pipe moves at layout rates of about 8 to 30 feet per minute which gives sufficient residence time for a partial hardening of the concrete before the polyurethane is laid down. The polymer coating then hardens much faster, in less than one minute. The concrete is thus protected from the effects of sea water so that it can continue to set up during the next 24 to 48 hours when submerged.

For the above described operations the small volume exterior tanks 310 and 312 are connected to larger storage containers mounted within the ship hull 110. Suitable processing equipment such as mixing tanks and Banbury mills can be employed for homogenizing and preparing the various coating materials.

The coating 510 is, in general, a thick walled relatively inflexible coating of from about ⅛ to 8 inches in thickness. For some pipelines even thicker coating layers are used. Various mineral additives and aggregates such as barites, ferrites, alumina, taconites, and metal pellets can be employed in the coatings.

Additional Coating Materials

A wide range of coating materials can be applied within coating jacket 314. Both thermoplastic and thermoset resins are usable. The following thermoplastic resins are useful for this purpose. Vinyl chloride/acetate copolymers having molecular weights of 20,000 to 22,000 and containing about 95% vinyl chloride monomer can be prepared and applied as follows. The copolymers can be plasticized on a roll mill and applied directly as a coating utilizing a hot extrusion method. Such a coating has a chemical inertness superior to rubber. Polyvinyl chloride (PVC) plasticized with a wide range of plasticizers can be mixed in a Banbury or a regular rubber mill and used for a heat shrunk coating on the pipeline 50. Plasticizers such as tricresyl phosphate, dibutyl phthalate, dioctyl phthalate, triglycol esther and nitril rubber can be included. Various copolymers of vinyl chloride and vinylidene copolymers can be prepared in stable colloidal dispersion and coated on the pipeline 50. Thereafter heaters installed within the coating jacket 314 can bake the coating for adherence. The best of these coatings have greater than 85% vinylidene chloride monomer and are extremely resistant to solvents and are inert to salts. Polyamides produced by reactions of diamines and dibasic acids and usually referred to as nylons can be employed directly by extrusion at temperatures above the melting points [253° C., in the case of nylon 66]. Such high temperatures are; however, difficult to maintain within coating apparatus 314 and the nylons are not economically preferred. Dichlorostyrene/butadiene copolymer, styrene/butadiene copolymers, and various polyalkylenes such as polyethylene, polypropylene, polybutylene and polyisobutylene can be employed.

When a coating material such as a polyalkylene is used at an elevated temperature within the storage tanks 310 and 312, the conduits 316 and 318 are insulated.

Another class of thermoplastic coatings are the synthetic rubbers such as copolymers of styrene and acrylonitrile known as the nitril rubbers for which the phthalates are used as plasticizers. Such nitril rubbers have been utilized for many years as cable coatings which are resistant to oil and abrasion. The butyl rubbers (GR-I) produced from isobutylene/isoprene copolymerization can also be employed. These materials are shipped uncured and mixed with about one part by weight zinc stearate and about one half part by weight phenyl beta/naphthylamine and are soft enough to flow under their own weight. It is not necessary to run such butyl rubber through a mastication process before compounding. Rather, it can be placed directly into the Banbury mill contained within the hull 110 and mixed with appropriate softeners and vulcanizing agents. If desired a carbon black filler can also be employed to increase resistance to abrasion. The various polysulfide rubbers which are formed by the condensation reaction of organic dihalides with sodium polysulfides can also be employed. One such polymer known as THIOKOL A has been utilized for many years as a concrete storage liner for storing petroleum. When a polysulfide rubber is to be employed, it is coated onto pipeline 50 by a Schori flame process in which it is sprayed on with a open flame.

The thermoplastic resins are applied by heated extrusion techniques as described in U.S. Pat. No. 3,216,080 to Norton and U.S. Pat. No. 4,182,782 to Scheiber. The extrusion sleeves are installed within coating jacket 314 along with any necessary heating means such as shown in the latter patent. The specific polymer coatings set forth in these patents can be used on pipeline 50.

The thermoset polymeric coatings of choice for the present invention are crosslinked epoxy resins, polyesters and polyurethanes. The latter is preferred. The polyfunctional isocyanate can be one of the monomeric diisocyanates such as tolylene diisocyanates, diphenylmethane 4,4′-diisocyanate, and 3,3′-butolylene, 4,4′-diisocyanate. Higher molecular weight diisocyanates can be formed by the reaction of tolylene diisocyanate and polybutanediol. A specific modified epoxy resin which is employed as a superior exterior lining for oilwell tubing is one in which furfural resins are used as crosslinking modifiers. Another modifier which also improves the flexability and chemical resistance of epoxy resins are the methylol bearing phenol and melamine resins. Thus, the latter two types of resins can be employed as modified for the epoxy resins to produce superior coating materials.

The thermoset resins are applied, in general, by spraying of the reactants onto the surface of pipeline 50 from a series of mixing nozzles such as nozzle 15, shown in U.S. Pat. No. 4,142,555 to Satake et al. Electrostatic coating techniques as described in U.S. Pat. No. 3,661,624 to Versoy et al for use with epoxy (and also vinyl resins) can be used. The application of plural coatings of polymers and curing steps as described in U.S. Pat. No. 4,481,239 to Eckner can also be used for a side range of pipeline coatings. The specific coating disclosed in the above noted patents can be used on pipeline 50.

Since much of the work of pipelaying vessels occurs in northern latitudes such as in the North Sea, insulating storage tanks 310 and 312 and insulated conduits 316 and 318 are preferred. The coating jacket 314 can also be provided with a heat source 317 in order to hold the materials utilized in a thermoplastic state prior to discharge of the coating through the terminal end 338.

In the case where multiple coatings are to be sequentially deposited on the pipeline, the two supply tanks 310 and 312 are used for the separate coating materials. A second axially spaced entry port 315 is provided for connecting one of the two supply lines 316 or 318 so that the second layer 323 is deposited on the outer surfaces of the first coating 325 rather than on the outer surface of the pipeline. For example, as above disclosed; tank 310 supplies a fast setting concrete to mixing valve 320 at part 321 which is then used in a non-mixing mode of operation and tank 312 supplies a polymer overcoating through line 318 which is connected to port 315. The polymeric overcoating then protects the concrete layer from the effects of sea water during the post layout curing process. A relatively thin polymer layer can be used for this purpose since it is not functionally necessary after the concrete has cured. More than two tanks and supply lines can be used to apply plural coats of polyurethane and other synthetic resins of types disclosed in U.S. Pat. Nos. 3,042,545 to Kienle and 3,420,277 to Ceintrey. A concrete coat can be put on before or after one or more resin coats.

The internal baffling with coating jacket 314 can be arranged either concentrically or axially for depositing first, second, and additional layers successively on the pipeline 50 as it moves through the coating apparatus 30. Such baffling and input port arrangements are known in the pipe coating art. The inlet port 315 is shown as axially spaced from the first port 321 in FIGS. 3, 4 and 8. The coating jacket 314 can also provide for curing of previously deposited layers before the application of the subsequent layers as by internal heating means 317 which cure the previous coating prior to the subsequent coating material addition zone. Such multiple coating layer apparatus 30 can provide for a large number of coated layers on the pipeline 50 when the economics of a particular job permit the use of complex coating jackets 314 and materials.

If desired various conduit supporting equipment (not shown) can be provided by mounting the same on the stern section 116 of hull 110 for supporting the conduits 316 and 318.

Figure 4:
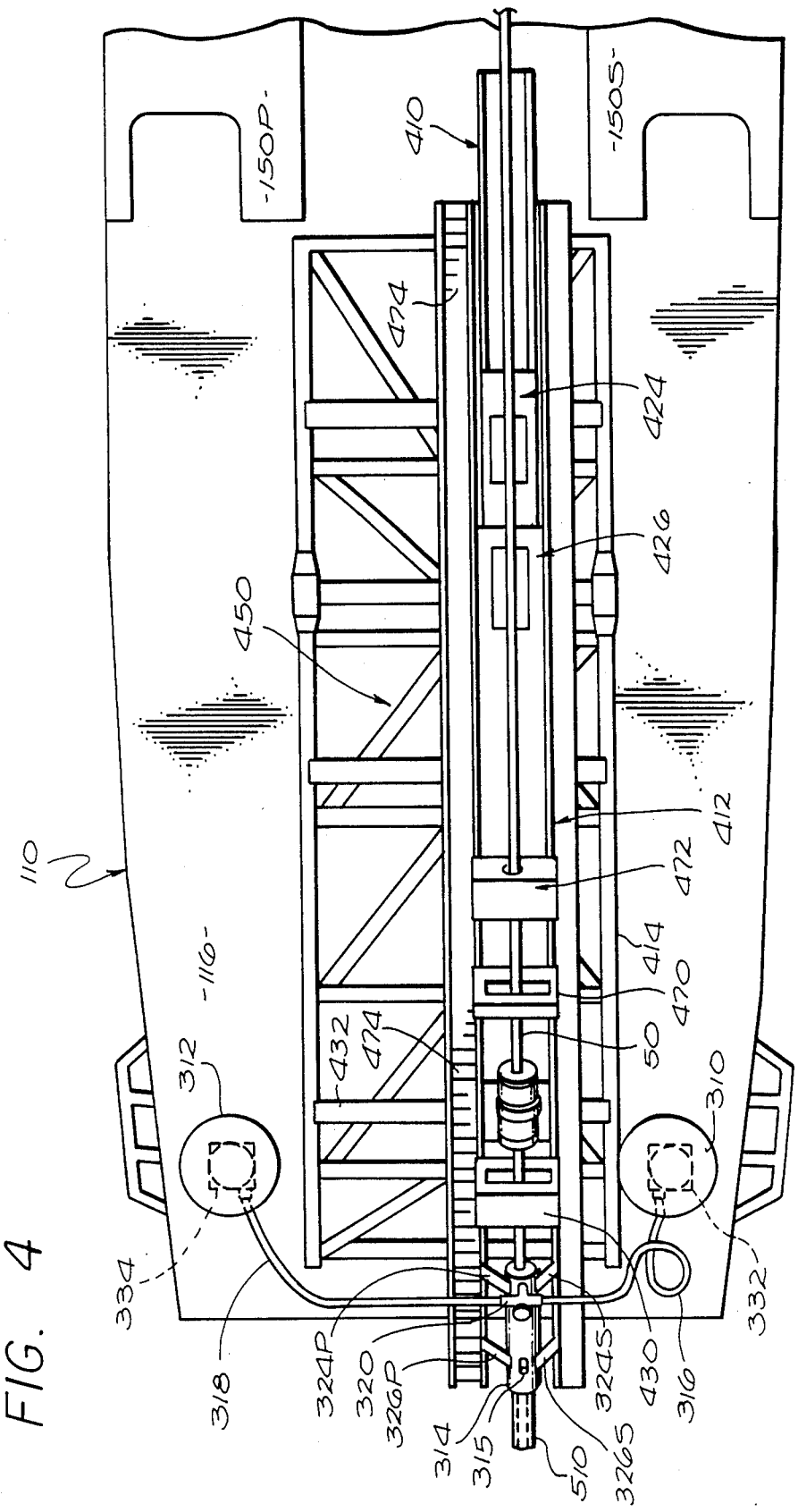
FIG. 4 is a top plan view of the vessel and coating apparatus of FIG. 3.

Also shown in FIG. 3 is the clamping assembly support 466 for securing the pipe tie-in clamping assembly 428 to the level wind assembly 412. An aft positioned pipe guide assembly 470 can also be provided on the aft side of the clamping assembly 428. An auxiliary pipe clamping assembly 472 can also be provided if desired as shown in FIG. 4.

Also as shown in FIG. 3 an access stairway 474 can also be provided along the entire length of the level wind assembly 412 to provide access to the pipe conditioning equipment 460 as well as the coating apparatus 30.

Second Vessel Embodiment

FIGS. 5 and 6 shows a reel vessel in the form of a pipelaying barge, generally designated 60, which is designed to carry a main pipe-spooling reel system 70 and pipe conditioning equipment, generally designated 80, together with pipe coating apparatus, generally designated 90 located adjacent the stern of the vessel. The barge 60 is that shown in U.S. Pat. No. 3,712,100 to Key et al.

The horizontally disposed main reel 710 has a lower flange 712 and a top flange 714 between which a conically shaped spool 716 is positioned for the storage of a series of turns 718 of a relatively inflexible pipeline 52. The main reel 710 is rotatably mounted on a bearing system located in the aft section 610 near the bow 612. The main deck 614 also has a mid-section 616 on which the pipe conditioning equipment 80 is affixed. The pipe coating apparatus 90 is located on the stern section 618. The hull 620 is in the form of a flat barge with an inclined ramp 622 positioned in the stern section 618 as best shown in FIG. 5.

The pipe conditioning apparatus 80 consists of a pipe straightener shoe 810, a second straightener 812, and an auxiliary straightener shoe 814. The latter two straighteners are positioned on the base assembly 818.

The compound straightening or bending system 816 which is formed from the bending tools 810, 812 and 814 are mounted on a series of deck posts 622, 624, 626, 628, 630 and 632, the pipe conditioning apparatus 80 has a level-wind base assembly 818 which is movable vertically on the posts 626–632. The bending tool 810 is affixed to the aft end of the base assembly 818 and is also movably vertically along the posts 622 and 624 as shown in FIG. 5. The vertical movement of the bending tool 810 and the base member 818 are provided for level winding of the pipe conditioning equipment so that it is at the same level as a particular turn of pipeline which is unreeled from the main horizontal reel 70. The vertical movement power can be by any suitable means such as a hydraulic system shown schematically as 820.

As shown in FIG. 6, the mounting posts for the base assembly 818 have both starboard and port matched posts, A tensioning assembly 822 is also mounted on the base assembly 818. The compound bending or straightening tools 810, 812 and 814 as well as the tensioner 822 operate as described in U.S. Pat. No. 3,712,100. Guide stanchions 634 and 636 are also mounted to provide guiding of the pipeline 52 as it is moved toward stern section 618 from tensioner 822. The pipeline then passes through a coating jacket 910 which is mounted on footings 912 and 914.

As in FIGS. 1–4, the pipe coating apparatus 90 consists of two or more storage tanks 916 and 918 which are connected via conduits 920 and 922 to a mixer device 924. The coated pipeline 512 then issues from the stern end of the coating jacket 910. Suitable pumping mechanisms 926 and 928 are provided in connection with the flow of coating materials from both of tanks 916 and 918, again as in FIGS. 1–4. The same type of coating materials are utilized in this pipelaying barge embodiment shown in FIGS. 1–4.

As shown in FIG. 6, the reel 710 is mounted with a hub 718 on the deck of the barge 620. Also, the straightening tool 810 is mounted with a curvature 824 which provides for contact with the pipeline when unreeled from a position near to the hub 718 as shown by the unspooling path 514 and also when unspooled from the outer most position as shown by unspooling path 516 as well as the intermediate path positions 518.

When applying coatings of thermoplastic material such as polypropylene, heating means are preferably used in the storage containers and supply tanks as well as the supply lines 316 and 318 of vessel 10 and lines 920 and 922 of vessel 60. Heat may also be applied to the front or upper end of the coating jackets 314 and 910, respectively; to assure the deposition of a continuous coating about the pipeline. Also, if desired, the stern or bottom section of the jackets can be fitted with cooling means to assist in the thermohardening of the deposited coating material. Conventional cooling coils or a cooling fluid subjacket can be used for this purpose.

The coating means on apparatus 30 and 90 can be fitted with manually controlled mixer valves or devices 320 and 924, respectively, as shown or with automatically operated means.

If desired, a portable reel system such as shown in U.S. Pat. Nos. 3,855,835 and 4,157,023 to Tisdale et al; 4,260,287 to Uyeda et al and 4,243,345 to Cha et al can be used for the spooling and unspooling of the pipeline in the present invention. The use of a portable reel and coating means permits a wide range of vessels to be employed for use with the present invention since such portability features can be used with ship-shaped vessels including service boats and tug boats, barges, and various semi-submersible vessels such as described in U.S. Pat. Nos. 3,685,305 and 3,704,596 to Lloyd; 3,924,415 and 4,232,625 to Goren et al.

Automated Coating Operations

Figure 7:
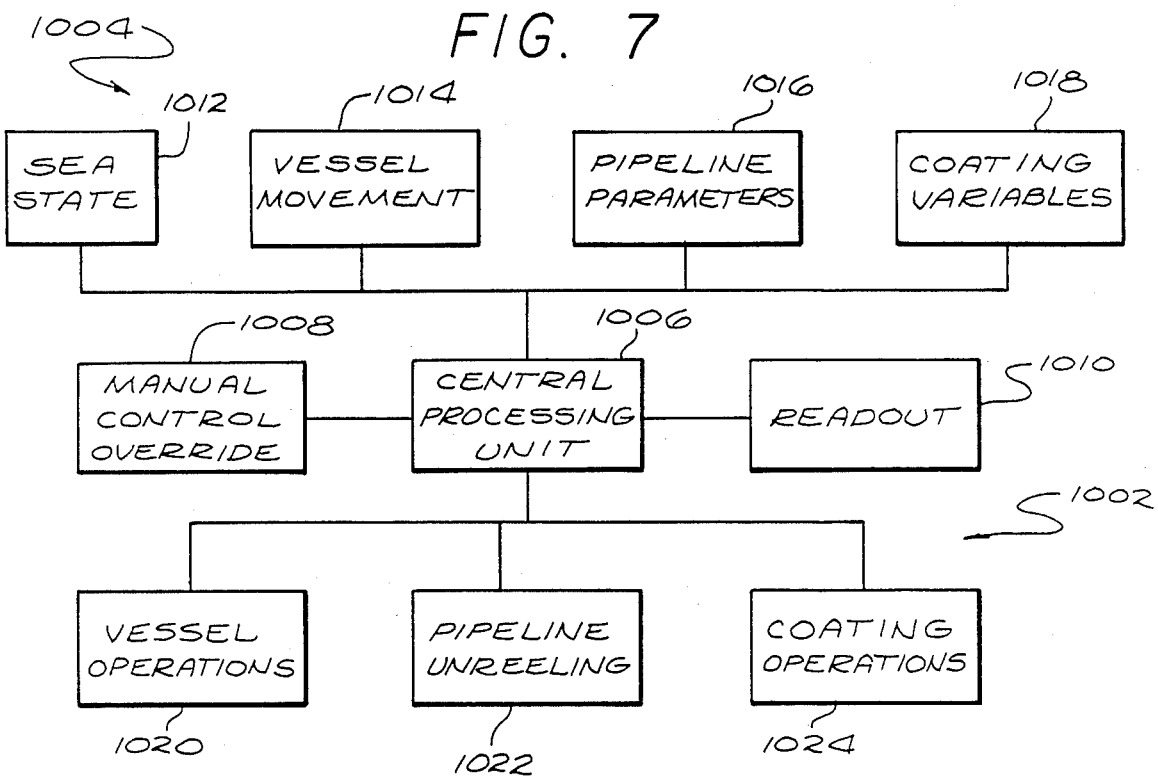
FIG. 7 is a schematic diagram of an automatically operated coating apparatus.

An automated coating control system 1002 is illustrated in FIG. 7 and operates on the basis of data inputs which are continuously or periodically monitored and fed into a central processing unit 1006. Operating algorithm computer programs are stored in the central processing unit in order to effect given output signals for various input conditions 1004. The programs can be changed to provide for different operating instructions for various types of coating materials and for diameters of pipeline. Also a manual control override feature block 1008, is utilized for the central processing unit. A continuous readout 1010 is also integrated into this system.

The output signals from the automated control system 1002 are utilized to operate the vessel, unreel the pipeline, and coat the same.

The input data is gathered for: (1) sea state, block 1012, (2) vessel movement, block 1014, (3) pipeline perimeters, block 1016, and (4) coating variables, block 1018. Data collected for the sea state are current velocity, wave height, frequency, and direction and periodicity of sea swells. Vessel movement data includes velocity, direction of movement, and angles of and frequency of heave, pitch, roll and yaw. Pipeline perimeters include layout velocity, entry angle and modulus of flexibility. The coating variables which are continuously monitored are the pumping supply rates, curing time, and heat input and extraction to the coating apparatus.

The output signals are utilized for controlling the vessel operations, block 1020, by providing stability compensation such as by controlling the ballast water added or removed from the hull; propeller and rudder control, and dynamic positioning through the thrusters 122 and 126.

The pipeline layout speed can be controlled by operation of the reel and operations, block 1024, hence, the unreeling speed, block 1022, is controlled. The coating operations, block 1024, can be controlled by use of output signals to control pumping operations, the flow of coating jacket. The operations of the mixing devices and the heating and cooling functions on the coating jacket can also be similarly controlled.

Coating Jacket

The coating jackets 314 and 910 as disclosed herein are fitted with a removable insert collar which is designed to accept a particular diameter of pipeline being coated. The stern end of the coating jacket is then fitted with a collar to aid in the molding and finishing of the coating surface. As disclosed above, various heating and cooling means can also be utilized for the operation of the coating jacket.

The disclosures of the patents referred in the above Detailed Description sections are incorporated by reference as though fully set forth.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A reel pipelaying vessel having a rotatably mounted reel for storage and for continuously unspooling of a pipeline and containing thereon pipe conditioning means located downstream of the reel in the direction of unspooling; said pipe conditioning means being adapted for straightening and for providing tension for said pipeline; said vessel including weight coating means adapted for continuously applying at least one weight coating layer to said pipeline as said pipeline moves continuously through said coating means, said coating means being located downstream of said pipe conditioning means in the direction of unspooling.

2. A reel pipelaying vessel according to claim 1, wherein said reel is mounted on said vessel with a horizontally positioned axis.

3. A reel pipelaying vessel according to claim 1, wherein said reel is mounted on said vessel with a vertically positioned axis.

4. A reel pipelaying vessel according to claim 1, wherein said coating means includes a jacket adapted for surrounding the pipeline a coating materials supply means operatively connected to said jacket.

5. A reel pipelaying vessel according to claim 4, wherein said coating means includes a mixer device and at least one coating materials supply tank operatively connected to said device.

6. A reel pipelaying vessel according to claim 4, wherein said coating materials supply means includes a mixer intake valve, at least two positionable conduits connected thereto, and at least one supply tank operatively connected to each of said conduits.

7. A reel pipelaying vessel according to claim 6, wherein pumping mechanisms are provided for said supply tanks and are interposed between said tanks and said conduits.

8. A reel pipelaying vessel according to claim 4, wherein said coating material supply means is adapted for manual control of coating materials to said jacket.

9. A reel pipelaying vessel according to claim 4, wherein said coating materials supply means including an automatically controlled mechanism for controlling the input of coating materials to said jacket.

10. A reel pipelaying vessel according to claim 1, wherein said coating means is adapted to provide in sequence a plurality of coating layers to said pipeline.

11. A reel pipelaying vessel according to claim 10, wherein said coating means is connected to coating materials supply means comprising a plurality of supply means and wherein said supply means are each adapted for the input of separate coating materials to said coating means for the deposit of a plurality of coating layers in sequence to said pipeline.

12. A reel pipelaying vessel according to claim 1, wherein heating mans are provided for maintaining elevated temperatures for coating means to promote flowable coating materials.

13. A reel pipelaying vessel according to claim 1, wherein storage means for said coating materials are maintained in association with said vessel.

14. A reel pipelaying vessel according to claim 6, wherein said coating materials supply means are maintained in association with said vessel and are adapted for communication with said supply tanks.

15. A weight coating apparatus for use on a reel piepelaying vessel having pipe conditioning means, said weight coating apparatus including a coating station positioned adjacent a pipeline being continuously unspooled from said vessel, supporting means for said coating station operatively secured to said vessel to the aft of said conditioning means, and coating materials supply means connected to said coating station, said coating station including means for continuously applying at least one weight coating layer to said pipeline as said pipeline moves continuously through said coating station downstream of said conditioning means.

16. A coating apparatus according to claim 15, wherein said coating materials supply means includes a mixer device operatively connected to said coating station, and wherein coating material supply means are operatively connected to said mixer device.

17. A coating apparatus according to claim 16, wherein said coating materials supply means includes at least two supply tanks mounted on said vessel, positionable conduits connected between said supply tanks and said mixer device and pumping means interposed between said supply means and said conduits to provide for fluid flow of coating materials to said coating station.

18. A coating apparatus according to claim 15, wherein said coating station contains application means adapted for depositing a plurality of coating layers, successively about said pipeline, and wherein a plurality of supply means are operatively connected to said coating means for the input of separate coating materials.

19. A coating apparatus according to claim 15, wherein said coating station includes heating means for maintaining flowability of said coating materials.

20. A coating apparatus according to claim 15, wherein said coating materials supply means is adapted for manual control of coating materials to said coating station.

21. A coating apparatus according to claim 15, wherein said coating materials supply means is adapted for automatic control of coating materials to said coating station.

22. A coating apparatus according to claim 15, wherein said coating station includes a coating jacket and said coating materials supply means are adapted to coat said pipeline with a relatively inflexible coating.

23. A coating apparatus according to claim 22, wherein said inflexible coating is continuous and has a thickness of from about ⅛ to 8 inches.

24. A process of laying a weighted pipeline from a reel piepelaying vessel with at least one relatively inflexible weight coating layer of cement, including the steps of:
continuously unreeling and conditioning a pipeline;
then continuously passing said pipeline through a weight coating station;
supplying at least one coating material of cement in pumpable form to the weight coating station;
hardening the coating material about the pipeline in order to form at least one relatively inflexible weight coating thereon prior to discharge of the coated pipeline from the vessel; and
laying out the pipeline from said vessel.

25. The process according to claim 24, wherein said supplying step includes the depositing of a first coating layer on the pipeline and then the subsequent depositing of at least one additional coating layer on said first layer, and wherein said hardening step is adapted for providing hardening of each of the coating layers.

26. The process according to claim 25, wherein said subsequent depositing step includes the deposit of a plurality of additional coating layers.

27. The process according to claim 24, wherein said supplying step includes the depositing of a first coating layer of a quick setting concrete and then the subsequent depositing for at least one additional layer of a sea water impervious protective polymeric material.

28. The process according to claim 27, wherein a post coating curing of the concrete layer is effected after the coated pipeline is unreeled from the vessel out of contact with sea water due to the protective polymeric material.

29. The process according to claim 24, including the additional steps of:
heating the coating materials supplied to said coating station to maintain pumpability of the same; and
thereafter hardening the coating materials about the pipeline.

30. The process according to claim 24, wherein said step of supplying is carried out by pumping coating materials into said coating station.

31. The process according to claim 24, wherein said process includes the steps of adjusting the water entry angle of the pipeline and simultaneously holding the axial position of said coating station constant with respect to the axis of the pipeline.

32. The process according to claim 24, wherein the coating material is selected from the class consisting of quick setting concrete, thermoplastic, and thermosetting resins.

33. The process according to claim 32, wherein the coating material is a polyurethane formed by reacting a polyfunctional isocyanate reactant with a polyol reactant on the pipeline.

34. The process according to claim 24, wherein said vessel includes coating materials storage means and wherein said process includes the step of moving coating materials from the storage means to the coating station.

35. The process according to claim 24, wherein said vessel includes at least one supply tank and wherein said process includes the step of moving coating materials from the supply tank to the coating stations.

36. The process according to claim 24, wherein the coating material is sprayed onto the pipeline within the coating station.

37. The process according to claim 33, wherein the polyfunctional isocyanate reactants and the polyol reactant are sprayed onto the pipeline within the coating station to form a polyurethane coat.

* * * * *